Dec. 22, 1925.  1,566,720
J. E. ANDREAU
BEARING FOR ARTICULATION OF THREE CONNECTING RODS
Filed Oct. 2, 1925

INVENTOR
Jean Edouard Andreau,
By O'Neill & Bunn
Attorneys.

Patented Dec. 22, 1925.

1,566,720

UNITED STATES PATENT OFFICE.

JEAN EDOUARD ANDREAU, OF LEOGNAN, FRANCE.

BEARING FOR ARTICULATION OF THREE CONNECTING RODS.

Application filed October 2, 1925. Serial No. 60,050.

*To all whom it may concern:*

Be it known that I, JEAN EDOUARD ANDREAU, citizen of the French Republic, residing at Leognan, Department of Gironde, in France, have invented certain new and useful Improvements in Bearings for Articulation of Three Connecting Rods (for which I have, on the first day of October, 1924, filed an application for Letters Patent in France); and I do hereby declare the following to be a full, clear, and exact description of the invention, such as will enable others skilled in the art to which it appertains to make and use the same.

The invention relates to a novel assemblage of three connecting rods, such as would be disposed between the piston of an engine and two shafts, which are operated by the engine, and has for its object to provide a simple, durable and efficient joint for the cooperating ends of the connecting rods, as illustrated in the accompanying drawings, in which:—

Figure 1:
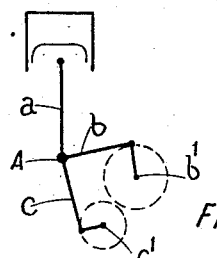
Fig. 1 is a diagram of the arrangement of the connecting rods as applied to a motor operating two crank shafts.
Figure 2:
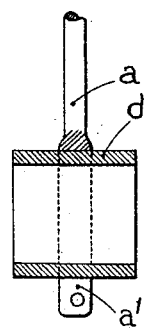
Fig. 2 is a fragmentary sectional elevation of the main connecting rod.
Figure 3:
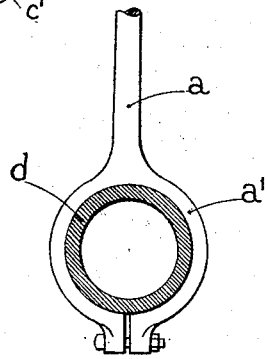
Fig. 3 is a side elevation, partly in section, of the same.

Referring to the drawings, $a$ indicates the main connecting rod, which is attached at one end, in the usual manner, to the piston of a reciprocating engine, such, for example, as an internal combustion motor, the outer end of the connecting rod $a$ being provided with an eye portion $a^1$, in which is rigidly clamped a tubular bushing $d$, which projects laterally on both sides of the eye portion of the rod.

Figure 4:
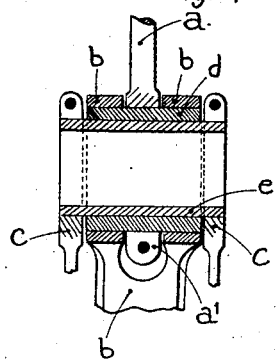
Fig. 4 is a fragmentary sectional elevation showing the joint between the ends of the three connecting rods.

The second connecting rod $b$ has one end forked to straddle the eye end of the first connecting rod $a$, the two members of the fork being provided with aligning openings, which are engaged by the outer surface of the bushing $d$, which latter, therefore, constitutes a journal bearing for the forked ends of the connecting rod $b$, as illustrated in Fig. 4.

The third connecting rod $c$ is likewise provided with a forked end, the two members of the fork being securely clamped to the ends of a second bushing $e$, which is journaled within the interior of the bushing $d$, said bushing $e$ being made sufficiently long to project beyond the ends of the bushing $d$, so that, when the forked members of the connecting rods $c$ are clamped to the ends of the bushing $e$, the inner faces of the forked members abut the ends of bushing $d$ and prevent lateral motion between the bushings $d$ and $e$. It will be noted that the bushing $d$ constitutes a bearing for the forked ends of both connecting rods $b$ and $c$, one bearing being exterior of the bushing $d$ and the other interior thereof, so that relative rotary movements between the connecting rods is facilitated and proper lubrication of the relatively moving surfaces may be readily effected.

As indicated in Fig. 1, the connecting rod $b$ is attached at its outer end to the crank arm $b^1$ of one shaft and connecting rod $c$ is similarly attached to the crank arm $c^1$ of the second shaft, so that the normal reciprocating motion of the engine piston will be transmitted by the first connecting rod $a$, through the compound joint A, thence by the second and third connecting rods $b$ and $c$ to the shafts on which the crank arms $b^1$ and $c^1$ are secured. As thus constructed and arranged, the joint A is light, strong and durable and may be constructed and applied at a minimum of labor and expense.

What I claim is:

A triple connecting rod assembly comprising the main connecting rod, a tubular bushing clamped in the end thereof, the second connecting rod having a forked end journalled on the exterior of said bushing laterally of the first connecting rod, a second bushing journalled in the first bushing and extending beyond the ends of the latter, and the third connecting rod having a forked end connected to ends of the second bushing.

In testimony whereof I affix my signature.

JEAN EDOUARD ANDREAU.